United States Patent [19]

Akamatsu

[11] Patent Number: 5,641,038
[45] Date of Patent: Jun. 24, 1997

[54] BEARING FOR USE IN COMPRESSOR FOR AIR CONDITIONER

[75] Inventor: Yoshinobu Akamatsu, Kuwana, Japan

[73] Assignee: NTN Corporation, Osaka, Japan

[21] Appl. No.: 321,153

[22] Filed: Sep. 14, 1994

Related U.S. Application Data

[62] Division of Ser. No. 765,074, Sep. 24, 1991, abandoned.

[30] Foreign Application Priority Data

Feb. 21, 1991 [JP] Japan .................................. 3-027146

[51] Int. Cl.⁶ ..................................................... F01M 1/00
[52] U.S. Cl. ................... 184/6.17; 92/154; 92/71; 417/269; 384/450
[58] Field of Search ......................... 384/450, 565, 384/569, 516, 513, 625; 92/12.2, 71, 154; 417/269; 184/6.17

[56] References Cited

U.S. PATENT DOCUMENTS

| | | |
|---|---|---|
| 2,482,312 | 9/1949 | Bachle . |
| 3,749,072 | 7/1973 | Schweikher . |
| 3,831,457 | 8/1974 | Kern . |
| 4,031,777 | 6/1977 | Parks . |
| 4,359,022 | 11/1982 | Nakamura et al. . |
| 4,632,074 | 12/1986 | Takahashi et al. . |
| 4,727,832 | 3/1988 | Miyamura et al. . |
| 4,767,283 | 8/1988 | Ikeda et al. ................................. 92/71 |
| 4,856,469 | 8/1989 | Okazaki et al. . |
| 4,893,387 | 1/1990 | Akamatsu et al. ....................... 384/450 |
| 4,909,197 | 3/1990 | Perr . |
| 4,987,865 | 1/1991 | Schenkel . |
| 5,064,298 | 11/1991 | Hibi et al. ................................. 384/450 |
| 5,088,897 | 2/1992 | Kawai et al. ............................. 92/154 |

FOREIGN PATENT DOCUMENTS 2408276  8/1975  Germany .

OTHER PUBLICATIONS

*Drehpunkt der Technik Steyr*, "Walzlager —Theorie und Praxis", M. Albert and H. Kottritsch, Springer–Verlag Wien, New York, 1987, pp. 153, 154, 301, 302.

*Primary Examiner*—Thomas E. Denion
*Attorney, Agent, or Firm*—Nikaido, Marmelstein, Murray & Oram LLP

[57] ABSTRACT

A roller bearing for use in a compressor for an air conditioner. Either the rolling elements or the bearing rings of the bearing is formed on their surface with a multitude of independent minute recesses in random directions. The surface is smooth at other portions than the recesses and the recesses have substantially the same size in the axial and circumferential directions.

2 Claims, 7 Drawing Sheets

EXAMPLE OF MEASUREMENT OF SURFACE ROUGHNESS (IN THE AXIAL DIRECTION)

EXAMPLE OF MEASUREMENT OF
SURFACE ROUGHNESS
(IN THE AXIAL DIRECTION)

↑ x1000
→ x100

EXAMPLE OF MEASUREMENT OF
SURFACE ROUGHNESS
(IN THE CIRCUMFERENTIAL DIRECTION)

↑ x1000
→ x100

EXAMPLE OF MEASUREMENT OF
SURFACE ROUGHNESS
(IN THE AXIAL DIRECTION)

↑ ×1000
→ ×100

EXAMPLE OF MEASUREMENT OF
SURFACE ROUGHNESS
(IN THE CIRCUMFERENTIAL DIRECTION)

↑ ×1000
→ ×100

5,641,038

BEARING FOR USE IN COMPRESSOR FOR AIR CONDITIONER

This application is a division of application Ser. No. 07/765,074 file Sep. 24, 1991, now abandoned.

FIELD OF THE INVENTION

This invention relates to a bearing for use in a compressor for an air conditioner.

BACKGROUND OF THE INVENTION

There are known various types of compressors for air conditioners, e.g. a type shown in FIG. 10 in which a piston 3 is reciprocated by a plate 2 having both sides inclined obliquely and fixed to an input rotary shaft 1, a type shown in FIG. 11 in which a piston 7 is reciprocated through a rod 6 by a plate 5 having one side inclined obliquely and fixed to an input rotary shaft 4, and a variable-capacity type as shown in FIG. 12 wherein a piston 11 is reciprocated through a rod 10 by an inclined plate 9 secured to an input rotary shaft 8 at an adjustable angle. Any of these types is provided at its rotary portion with roller bearings.

More specifically, in case of the type shown in FIG. 10, needle roller bearings 21 having a cage and thrust needle bearings 22 are used. The type shown in FIG. 11 uses shell type needle roller bearings 25 and thrust needle bearings 22 and the variable-capacity type shown in FIG. 12 uses needle roller bearings 21 having a cage and thrust needle bearings 22.

Such compressors used in an air conditioner contain a mixture of lubricant for bearings and refrigerant. The lubricant is repeatedly liquefied and vaporized due to compression and expansion by the compressor. Such lubricant is put under harsher conditions than ordinary hydraulic oils.

As described, bearings used in a compressor for an air conditioner are in a poor lubricating condition since the refrigerant tends to mix into lubricant and the amount of lubricant tends to decrease. This will cause peeling damage on the polling surfaces, which may lead to premature peeling.

SUMMARY OF THE INVENTION

It is an object of this invention to provide a bearing for use in a compressor for an air conditioner which has a high oil film forming capacity at the rolling contact portion and which is free from peeling damage.

In accordance with the present invention, a multitude of minute recesses are formed in a random manner in the surface of the rolling elements or bearing rings of bearings for use in a compressor for an air conditioner. The surface roughness is determined so that the ratio RMS(L)/RMS(C) is not more than 1.0 wherein RMS(L) and RMS(C) represent the surface roughness in the axial and circumferential directions, respectively, and so that the parameter SK value will be less than zero. The area ratio of the minute recesses is 10–40% and the average area of each minute recess is 35–150 square microns when calculated excluding the minute recesses having an equivalent circle diameter of less than 3 microns.

With this arrangement, the oil film forming ratio on the rolling surfaces improves and it was found out that no peeling damage developed on the rolling surface even under harsh lubricating conditions and thus the longevity of the bearings is prolonged.

DESCRIPTION OF THE DRAWINGS

Other features and objects of the present invention will become apparent from the following description taken with reference to the accompanying drawings, in which.

DESCRIPTION OF THE PREFERRED EMBODIMENTS

Figure 1:
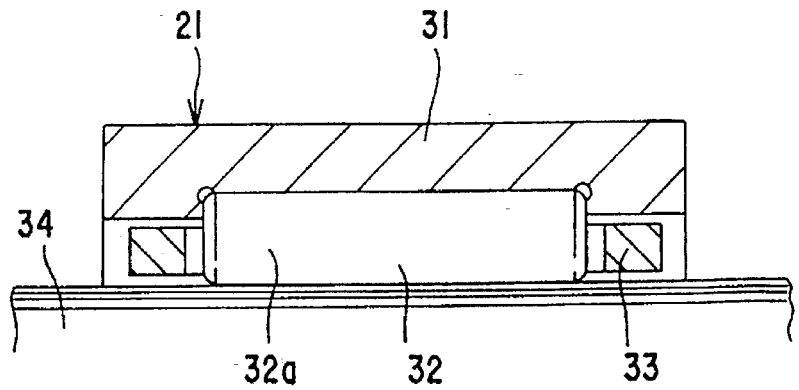
FIG. 1 is a sectional view of the needle roller bearing.
Figure 10:
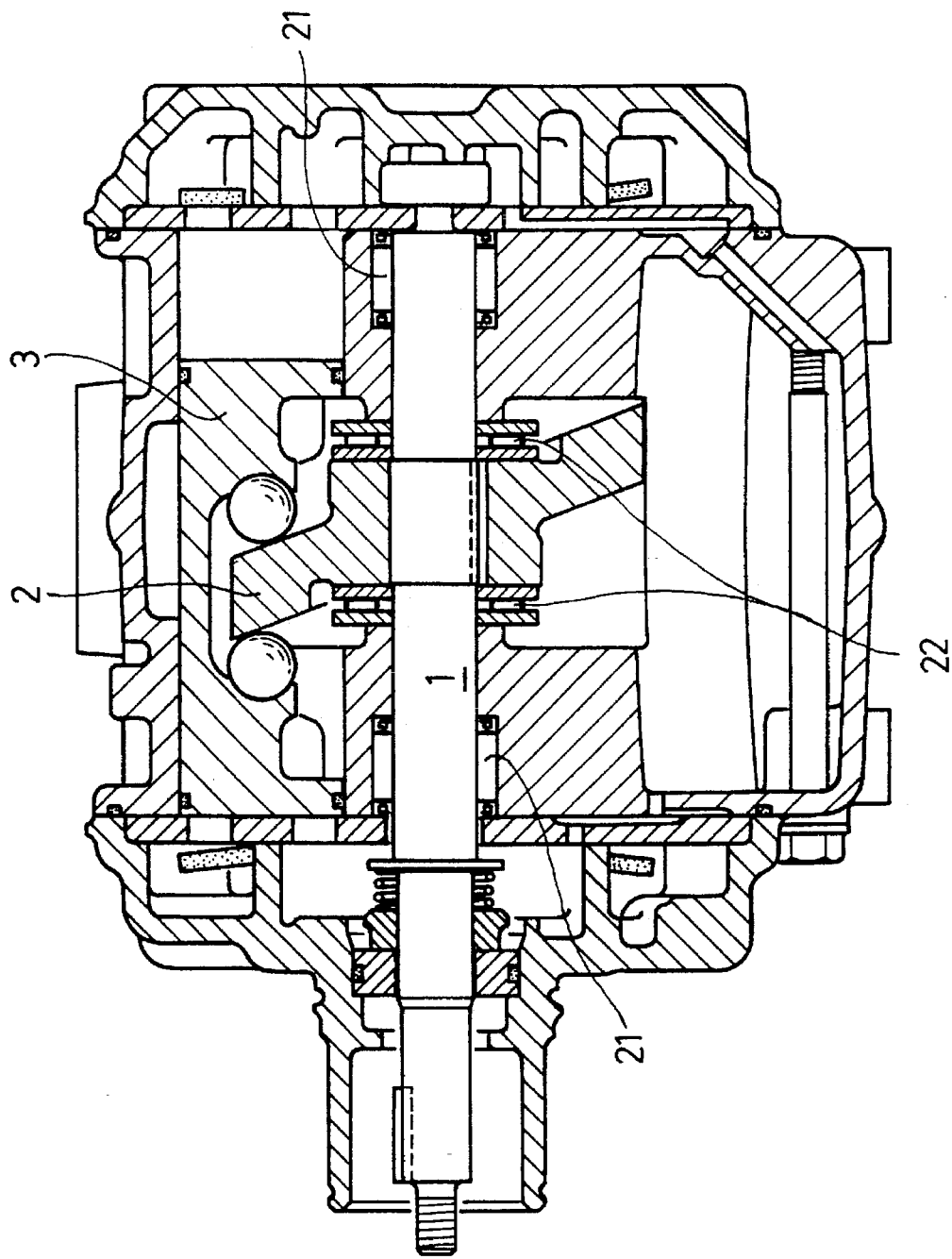
FIG. 10 is a sectional view of a compressor in which a plate having both sides tapered is used.
Figure 11:
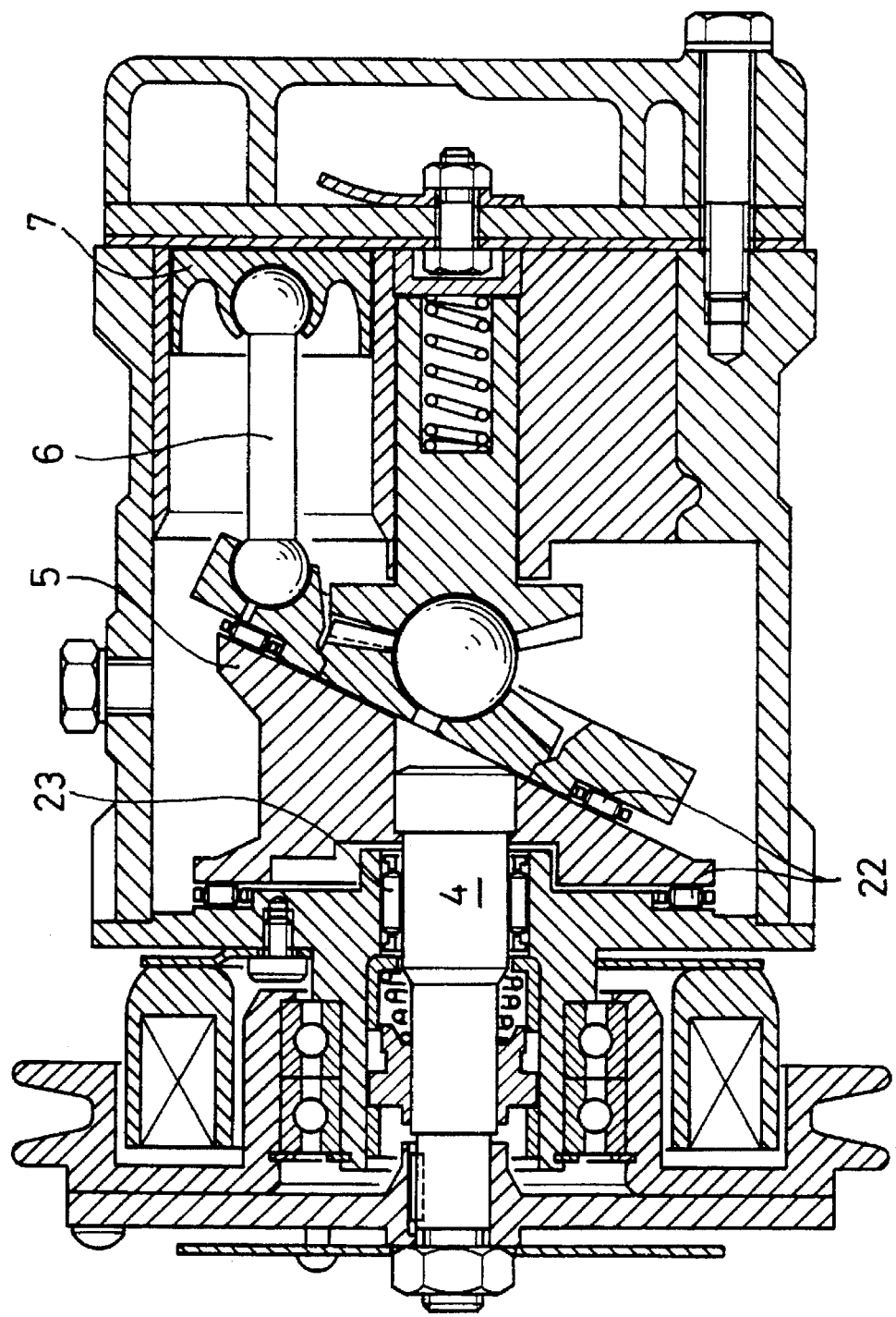
FIG. 11 is a sectional view of a compressor in which a plate having one side tapered is used.
Figure 12:
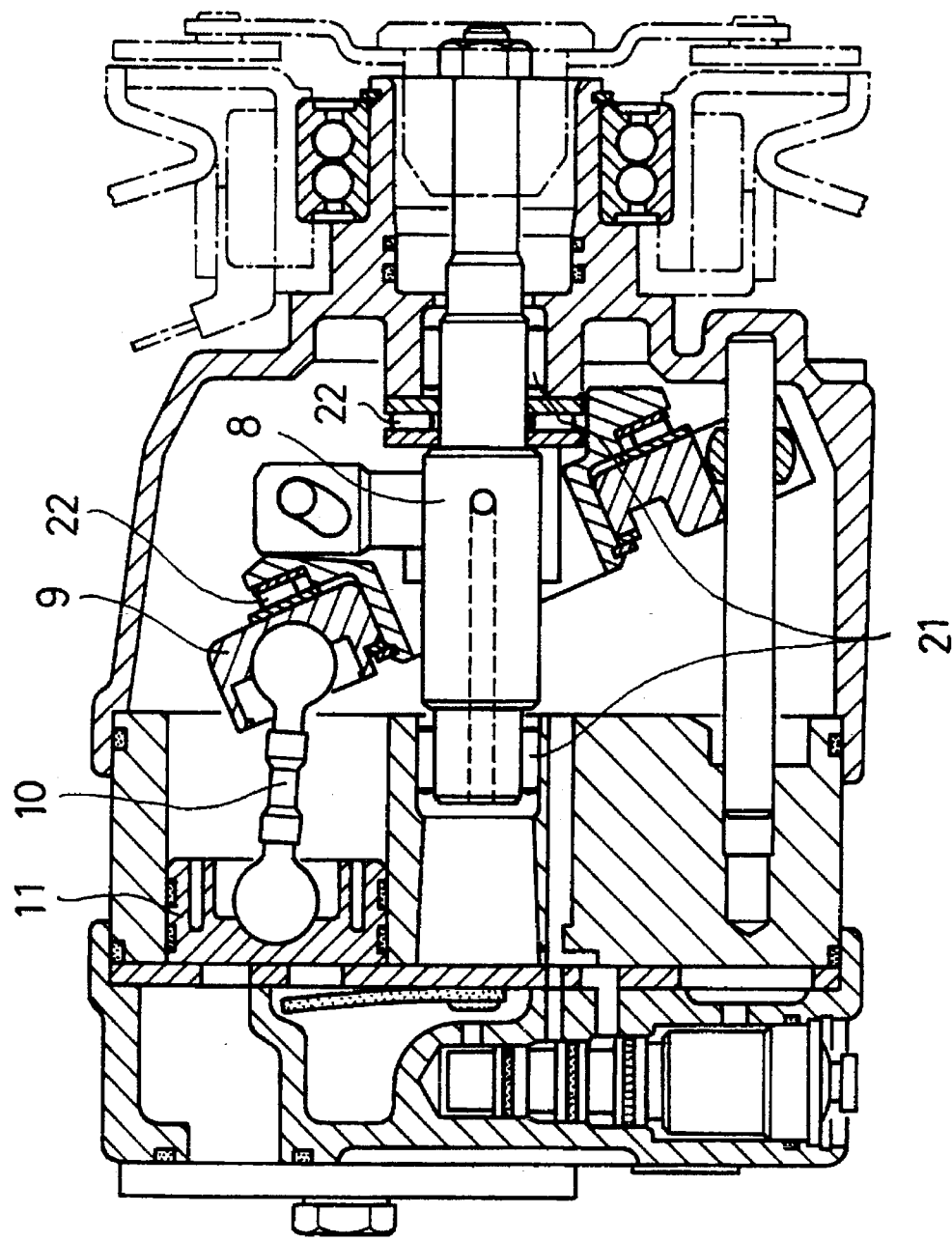
FIG. 12 is a sectional view of a compressor in which a variable capacity plate having one side tapered is used.

FIG. 1 shows a needle roller bearing 21 with a cage 33 to be mounted in compressors for air conditioners shown in FIGS. 10–12. It has an outer ring 31, rolling elements 32 mounted in the outer ring 31 and a cage 33 holding the rolling elements 32 at regular intervals. It is used to support a shaft 34 with the rolling elements 32.

Each rolling element 32 of the needle roller bearing 21 has a rough surface 32a formed with a multitude of independent minute recesses in a random manner. At other portions than recesses, the outer surface of the rolling element is formed to be smooth. The rough surface 32a should have an RMS(L)/RMS(C) ratio of 1.0 or less, e.g. 0.7–1.0, wherein RMS(L) is a surface roughness in the axial direction whereas RMS(C) is a surface roughness in the circumferential direction. Further the SK value, which is another parameter of surface roughness, should be less than zero, e.g. −1.6 or less, both in the axial and circumferential directions.

The outer peripheral surface having such a roughness as defined above can be formed by barreling.

The SK value represents the skewness of the curve showing the amplitude distribution of the surface roughness. If the roughness distribution forms a symmetrical curve as with a Gauss distribution curve, the SK value will be zero. It has been found that the shape and distribution of the minute recesses will be effective for the formation for oil film if the SK values in the axial and circumferential directions are not more than −1.6.

The surface area ratio of the total area of the minute recesses to the entire rolling surface of the rolling element 52 should be 10–40% whereas the equivalent circle diameter of each minute recess should be 150 microns or less and the average area of the recesses, when measured excepting those having an equivalent circle diameter of not more than 3 microns, should be 35–150 square microns.

In FIG. 1, the rolling elements 32 have rough surfaces 32a. But such a rough surface may be formed on the rolling surface of an inner or outer ring as a bearing ring.

Figure 2A:
FIG. 2 is an explanatory view showing the finished surface condition of a conventional rolling element.
Figure 2B:
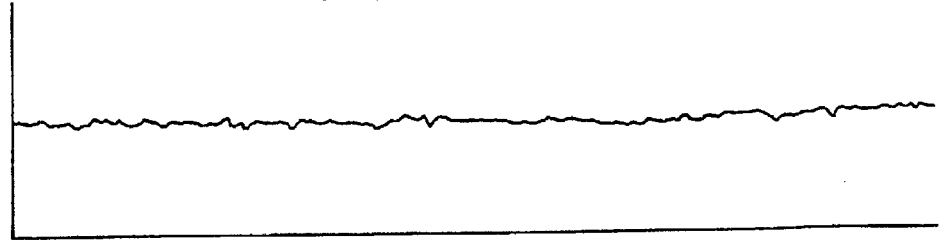
Figure 3A:
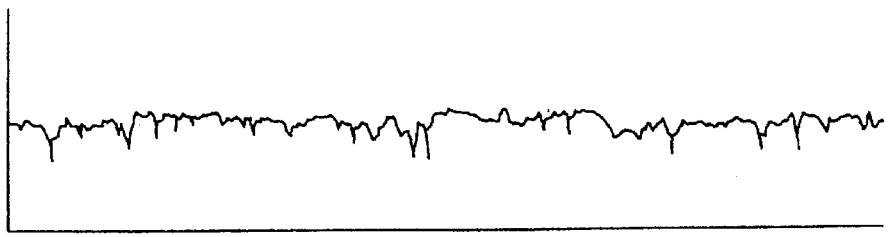
FIG. 3 is an explanatory view showing the finished surface condition of the rolling element according to this invention.
Figure 3B:

For comparison purposes, the finished surface condition of a conventional roller is shown in FIG. 2 and the recessed finished surface of a rolling element or an inner or outer ring according to the present invention is shown in FIG. 3.

A quantitative measurement of the minute recesses is possible by enlarging and analyzing the image of the rolling surface by use of a commercially available image analyzing system.

The white portions and the black portions in the image are analyzed as the flat portions and the minute recesses, respectively. For example, if an image analyzing system is used for analysis, the light and shade of the original is clarified with an exaggeration filter. Then the recesses not more than 3 microns in equivalent circle diameter, which are shown as very minute black portions, are removed with a noise eraser.

After the removal, the rolling outer surface is analyzed by measuring the size and distribution of the minute recesses and the ratio of the total area of the minute recesses to the entire surface.

Next, needle roller bearings were prepared which were formed on the surface of the rolling elements with minute recesses with different area ratios, average areas and average equivalent circle diameters and were put to a life test in which they were subjected to radial load.

Figure 4:
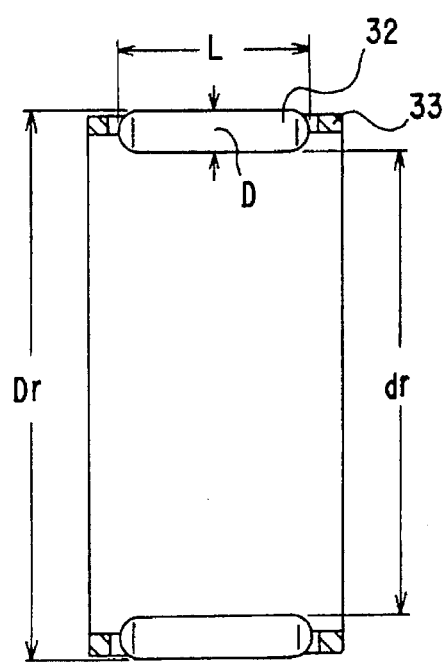
FIG. 4 is a sectional view of the needle roller bearing used for the life test.

As shown in FIG. 4, the needle bearings used for the life test were bearings each having 14 rolling elements held in a cage 33 and having an outer diameter Dr of 38 mm, an inner diameter dr of 28 mm, with the rolling elements having a diameter D of 5 mm and a length L of 13 mm.

Figure 5:
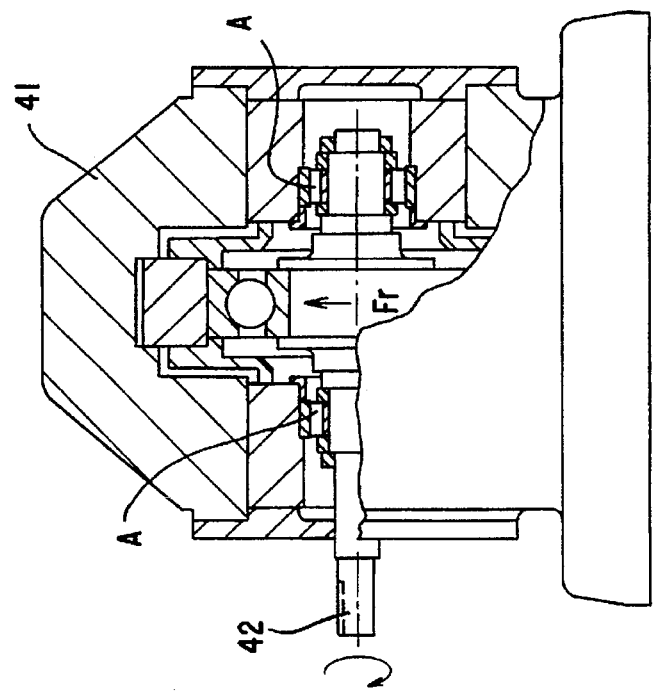
FIG. 5 is a schematic view of the testing device.

The testing device used was a radial load testing device 41 as shown schematically in FIG. 5. Test bearings A were mounted at both sides of a rotary shaft 42 and were rotated while exerting load thereon.

The inner race (mating shaft) used for the test was finished by grinding to Rmax of 0.4–4 microns. Also the outer race (outer ring) used was finished by grinding to Rmax of 1.6 microns.

Test conditions were as follows:

Radial load on bearings: 1465 kgf

Number of revolutions: 3050 rpm

Lubricant: turbine oil

Figure 6:
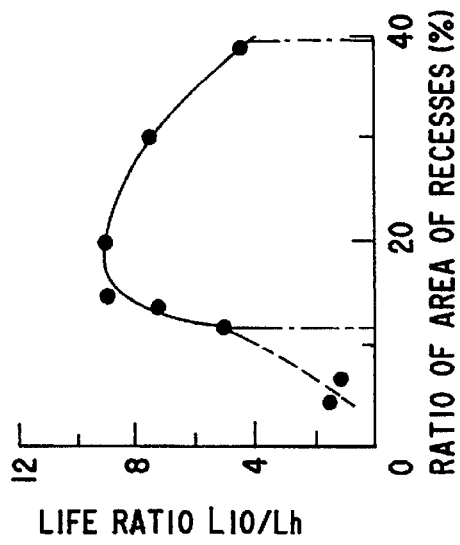
FIG. 6 is a graph showing the relation between the area ratio of the minute recesses and the durability.
Figure 7:
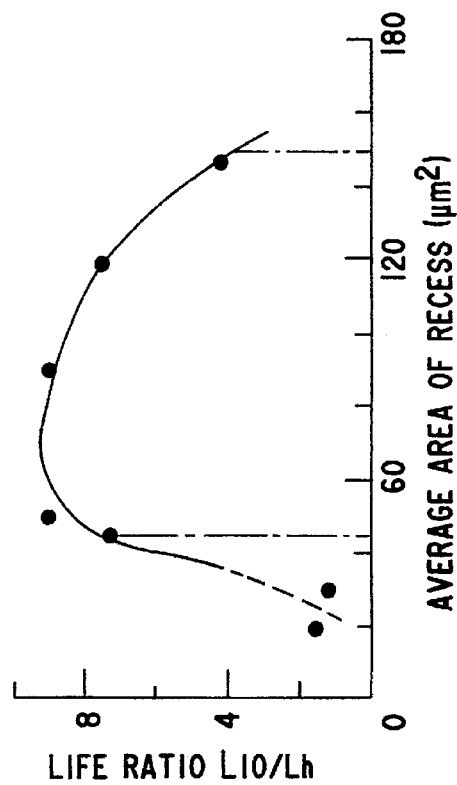
FIG. 7 is a graph showing the relation between the average area of the minute recesses and the durability.

FIG. 6 shows the relation between the area ratio of the minute recesses and the durability. FIG. 7 shows the relation between the average area of the minute recesses and the durability.

As will be apparent from FIGS. 6 and 7, those having an area ratio of 10% or more and an average area of 35 square microns or more had the ratio of durability (L10) to a calculated life of 4 or more, which is sufficiently high.

In the above life test, minute recesses were formed on the surfaces of the rolling elements of each needle roller bearing. But it was found that the durability will improve equally if such minute recesses are formed on the rolling surface of the inner or outer ring in a rolling bearing and the surfaces and the rolling surfaces of the rolling elements.

If the area ratio is 30% or more or the average area is 120 square microns or more, the effect of durability tends to decrease due to decrease in the effective contact length.

The bearing according to the present invention and prior art bearings were put to an acceleration peeling test to check the oil forming ability and anti-peeling properties on the finished surfaces of the rolling elements by use of a ring-to-ring type testing device under free rolling contact conditions. The condition of oil formation at the contact area was expressed in terms of metal contact ratio measured by the direct current resistance method. After a predetermined time period, it was checked if peeling initiated on the ring surface.

Test conditions:

Maximum contact surface pressure: 227 kgf/mm$^2$

Peripheral speed: 4.2 meter per second (2000 rpm)

Lubricant: refrigerating machine oil for compressor

Times of load applied: $4.8 \times 10^5$ (4 hours)

Voltage applied: 60 mV

Current passed: 3 mA

Figure 8:
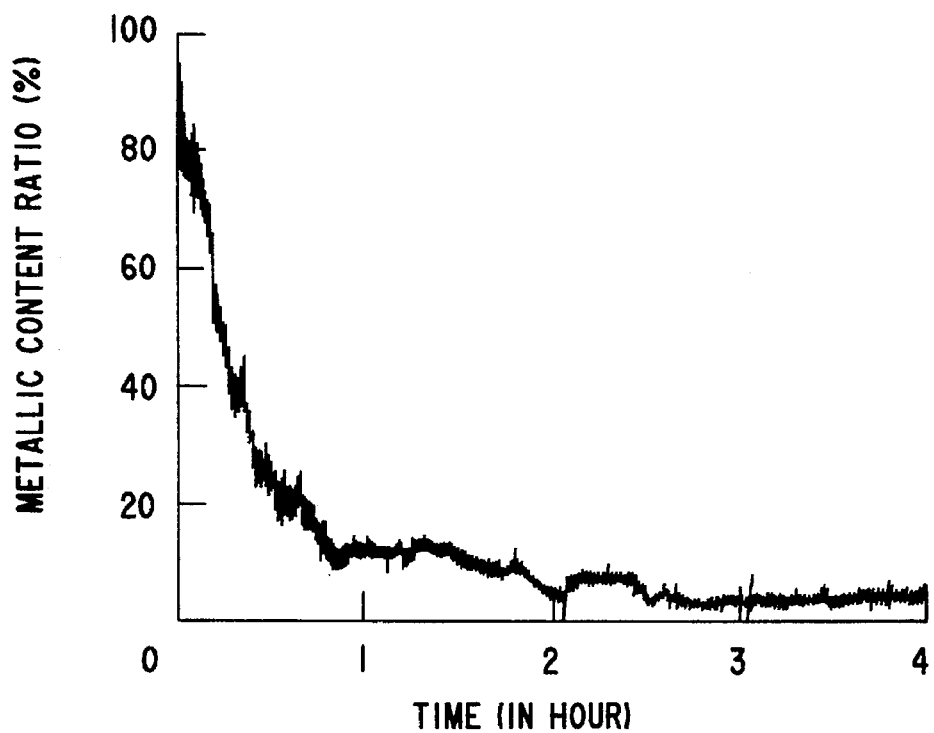
FIG. 8 is a graph showing the metallic contact ratio of a prior art bearing.
Figure 9:
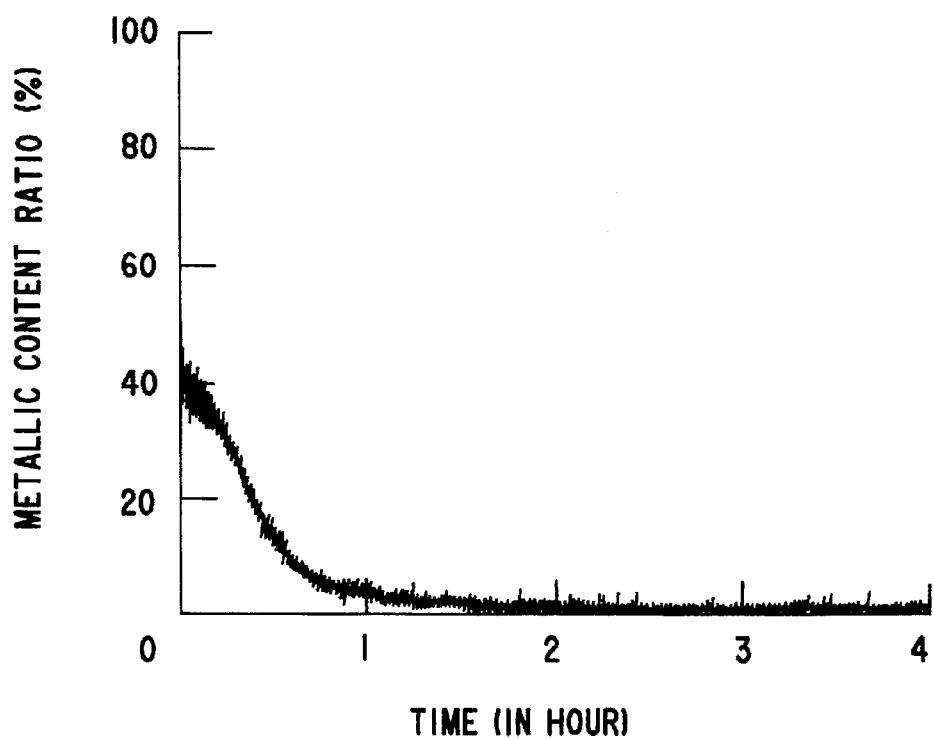
FIG. 9 is a graph showing the metallic contact ratio of the bearing according to this invention.

FIGS. 8 and 9 show the oil film formation ratios (=100%– metallic contact ratio) measured in this test. The oil film formation ratio on the finished surface of the bearing according to this invention was about 40% higher than that of the prior art bearing at the beginning of operation.

Also, it was confirmed that an oil film forms substantially completely in about 1.5 hours after the beginning of the test (when load is applied $1.8 \times 10^5$ times).

Further, while innumerable peelings about 0.2 mm long were observed on the finished surface of the prior art bearing, no such peeling was observed on the finished surface of the bearing according to this invention.

What is claimed is:

1. A compressor for an air conditioner, said compressor containing a mixed gas including a refrigerant and a lubricant and having a roller bearing, a rotary input shaft and an inclined plate mounted on said rotary input shaft for compressing and expanding said mixed gas, said roller bearing mounted in one of said input shaft and said inclined plate and said roller bearing being lubricated by the lubricant which is repeatedly liquified and vaporized with the refrigerant, said roller bearing comprising:

one of a) rolling elements and b) rolling elements and bearing rings, wherein either said rolling elements or said bearing rings are formed on a surface thereof with a multitude of independent minute recesses in a random manner, said surface has a ratio RMS(L)/RMS(C) of not more than 1.0 wherein RMS(L) is surface roughness in an axial direction and RMS(C) is surface roughness in a circumferential direction, wherein an SK value, another surface roughness parameter, is less than zero, and a ratio of total area of said minute recesses to the entire surface is 10–40%, and wherein at least a portion of said minute recesses hold a mixture of said lubricant and said refrigerant.

2. A roller bearing as claimed in claim 1, wherein the equivalent circle diameter of said minute recesses is not more than 150 microns, and the average area of the minute recesses calculated excluding those having an equivalent circle diameter of not more than 3 microns is 35–150 square microns.

\* \* \* \* \*